US011636037B2

(12) United States Patent
Brett et al.

(10) Patent No.: US 11,636,037 B2
(45) Date of Patent: Apr. 25, 2023

(54) METHODS AND APPARATUSES INVOLVING RADAR SYSTEM DATA PATHS

(71) Applicant: NXP USA, INC., Austin, TX (US)

(72) Inventors: Maik Brett, Taufkirchen (DE); Naveen Kumar Jain, Panipat (IN); Shreya Singh, Ranchi (IN); Anshul Goel, Ghaziabad (IN)

(73) Assignee: NXP USA, Inc., Austin, TX (US)

( * ) Notice: Subject to any disclaimer, the term of this patent is extended or adjusted under 35 U.S.C. 154(b) by 85 days.

(21) Appl. No.: 17/232,670

(22) Filed: Apr. 16, 2021

(65) Prior Publication Data

US 2022/0197804 A1 Jun. 23, 2022

(30) Foreign Application Priority Data

Dec. 21, 2020 (IN) .............................. 202021055543

(51) Int. Cl.
  *G06F 12/08* (2016.01)
  *G06F 13/42* (2006.01)
  *G06F 12/0831* (2016.01)

(52) U.S. Cl.
  CPC ...... *G06F 12/0835* (2013.01); *G06F 13/4282* (2013.01); *G06F 2212/621* (2013.01)

(58) Field of Classification Search
  CPC .......................... G06F 12/0831; G06F 13/42
  See application file for complete search history.

(56) References Cited

U.S. PATENT DOCUMENTS

| 9,274,960 B2 | 3/2016 | Kaxiras et al. |
| 2006/0095674 A1 | 5/2006 | Twomey |
| 2009/0037624 A1 | 2/2009 | Saripalli |
| 2015/0081984 A1 | 3/2015 | Blankenship et al. |
| 2016/0320481 A1* | 11/2016 | Ling ........................ G01S 13/87 |
| 2020/0358596 A1* | 11/2020 | Schat ....................... H04L 9/321 |

FOREIGN PATENT DOCUMENTS

| EP | 3445045 A1 | 2/2019 |
| EP | 3736599 A1 | 11/2020 |
| KR | 20190143732 A | 12/2019 |

OTHER PUBLICATIONS

PCI-SIG. PCI Express® Base Specification Revision 4.0 Version 0.3. Table of Contents and Section 7 (7.1-7.35), 301 pages (Feb. 19, 2014).

* cited by examiner

*Primary Examiner* — David E Martinez

(57) ABSTRACT

Exemplary aspects for a specific example concern a radar system having sensor circuitry including multiple radar sensors to provide sensor data via multiple virtual channels and multiple data types, a memory circuit with memory buffers, and a bus-interface circuit to control bus interconnects for bus communications involving a radar signal transmitter and the memory circuit. Radar signals are received and processed, via data acquisition path circuitry in multiple circuit paths and via streams of data in response to and to accommodate the operations of the sensor circuitry. A master controller conveys data, via the bus-interface circuit, to the buffers for the sensor data, and generates selectable-type transactions to be linked in selected ones of the buffers, in response to the data provided from the sensor circuitry and based on the sensor data being provided via different ones of the multiple virtual channels and of the multiple data types.

18 Claims, 6 Drawing Sheets

METHODS AND APPARATUSES INVOLVING RADAR SYSTEM DATA PATHS

CROSS-REFERENCE TO RELATED APPLICATIONS

This application claims priority under 35 U.S.C. § 119 to Indian Patent Application No. 202021055543, filed on Dec. 21, 2020, the contents of which are incorporated by reference herein.

OVERVIEW

Aspects of various embodiments are directed to a radar data acquisition apparatus including a signal processing circuit configured to detect an object based on use of data type, virtual channel based coherency, tracing attributes associated with debugging bus-interconnection switching fabric which may include, for example, SoC IC.

Conventional radar data acquisition systems may receive high speed serial traffic from external radar circuitry typically using communications schemes and bus interfaces using multiple virtual channels (VCs) and using multiple types of data. Moreover, each VC can use multiple types of data. MIPI CSI2 ((Mobile Industry Processor Interface Camera Serial Interface 2) provides examples of such radar circuit architecture (see, e.g., www.mipi.org/specifications/csi-2). For example, radar ADC data can use one data type while user/embedded data or safety info can use other data types. Also, receive acquisition systems which generate only coherent or only non-coherent transactions to the system for all VC/data types do not deliver optimal performance. Similarly, transmitters generating only coherent or only non-coherent transaction for all VC/data types for descriptor and data traffic do not deliver optimal performance, even in connection with acquisition using coherent transactions to write to memory when the data can be cache processed by the master/processor (master-controller/processor or as used herein, simply "master"). The master involved in processing these transactions may not have access to the shared cache and other relevant information such as with coherent transactions which are to be converted to non-coherent transactions. Previous attempts to analyze and/or improve the processing of these transactions have been limited.

Accordingly, these and other matters have presented challenges to efficiencies of radar data acquisition implementations, for a variety of applications.

SUMMARY

Various example embodiments are directed to issues such as those addressed above and/or others which may become apparent from the following disclosure concerning optimal use of data interconnect to various masters/processors in radar systems by controlling use of coherent and/or non-coherent transaction processing with indications via the receive circuitry paths of the type of data and/or of the virtual channel (VC).

In certain examples according to the present disclosure, a radar data acquisition apparatus and/or method is directed to use of selectable transaction data type in a vehicle-directed system architecture involving a radar signal transmitter to transmit radar signals towards an object to create reflected or echo signals and to enable the multiple radar sensors with abilities to receive chirp-to-chirp radar signals based on dynamic configuration parameters.

Another specific example concerns a radar system or use of the system in which there is sensor circuitry including multiple radar sensors to provide sensor data via multiple virtual channels and multiple data types, a memory circuit with memory buffers, and a bus-interface circuit to control bus interconnects for bus communications involving a radar signal transmitter and the memory circuit. Radar signals are received and processed, via data acquisition path circuitry in multiple circuit paths and via streams of data in response to and to accommodate the operations of the sensor circuitry. A master controller conveys data, via the bus-interface circuit, to the buffers for the sensor data, and generates selectable-type transactions to be linked in selected ones of the buffers, in response to the data provided from the sensor circuitry and based on the sensor data being provided via different ones of the multiple virtual channels and of the multiple data types.

In more specific aspects, the above radar data acquisition apparatus may use one or more data-processing efficiency parameters being associated with data throughput of bandwidth or use of one or more computer processors integrated within the apparatus, cache-processing availability by the computer processor(s), debug-tracing bandwidth relating to the bus-interface circuit, and/or switching capabilities of the bus-interface circuit. Also, each of the plurality of selectable-type transactions may be identifiable as a either a coherent transaction or a non-coherent transaction, or alternatively, each of the plurality of selectable-type transactions may be identifiable as a traceable transaction or a non-traceable transaction. In certain examples, each of the plurality of selectable-type transactions may be identifiable: as a coherent transaction or a non-coherent transaction; and as a traceable transaction or a non-traceable transaction. Further, the plurality of selectable-type transactions may be processed to manage one or more data-processing efficiency parameters associated with at least one of the radar signal transmitter; the bus-interface circuit, and the radar signal receiving circuit.

In yet further related examples, the multiple circuit paths of the data acquisition path circuitry are configured to process streams of ADC data to support the sensor circuitry.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
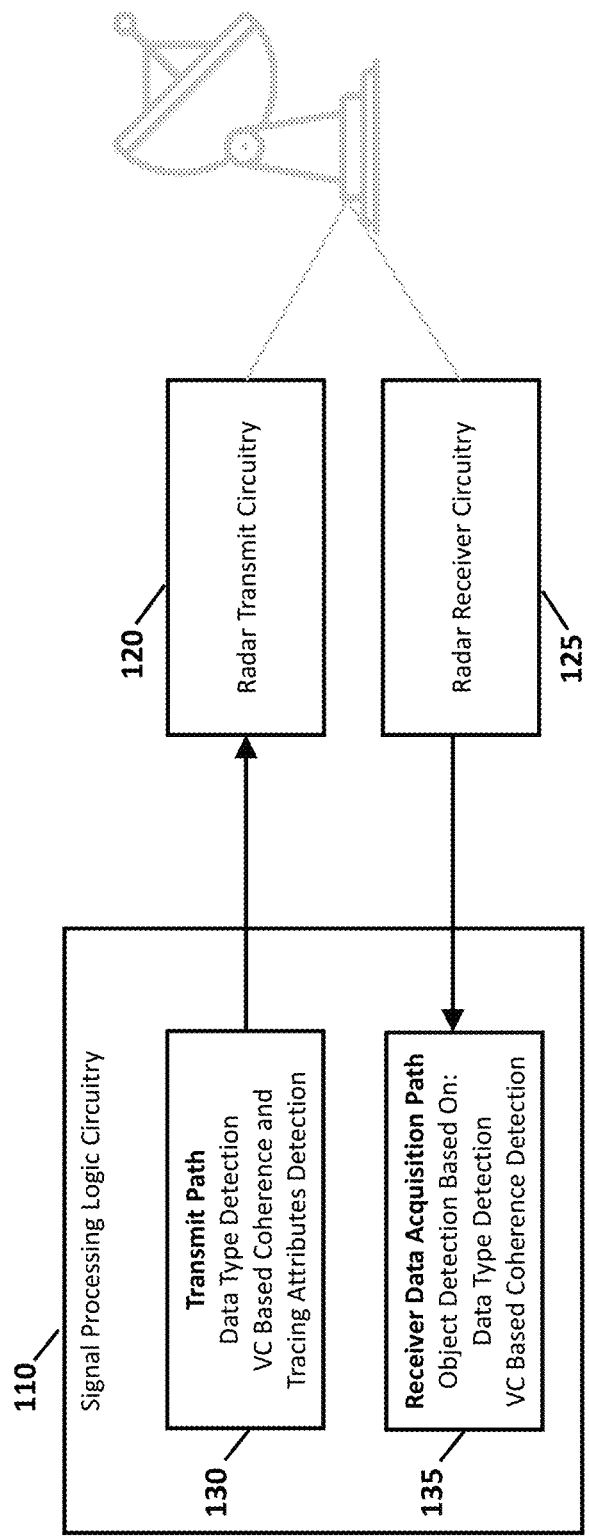
FIG. 1 is a system-level diagram illustrating an example radar systems transmit/receive signal processing circuitry, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving radar systems delivering multiple data types, over one or more virtual channels, and using coherent and non-coherent transactions in the transmit and receive paths. In certain implementations, aspects of the present disclosure have been shown to be beneficial when used in the context of radar systems using a MIPI CSI2 interface for transmit and receive data traffic, for example in a system installed in a moving vehicle. Such a system may use coherent and non-coherent data traffic when moving data. In some embodiments, radar receive data acquisition and transmit generate only coherent or non-coherent transactions to the switching fabric all the time may not deliver the optimal performance. As such, some radar applications may benefit from enhanced selection of coherent and non-coherent data transactions. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

According to specific examples of the instant disclosure, embodiments are directed to or involve a radar data acquisition apparatus which may include logic circuitry (e.g., a CPU, programmable logic array, etc.). This type of radar system may also include or be used with sensor circuitry, including multiple radar sensors, to provide sensor data via multiple virtual channels and multiple data types, and to receive configuration data useful for configuring the multiple radar sensors. The apparatus includes a memory circuit having a plurality of buffers, and a bus-interface circuit to control bus interconnects for bus communications involving a radar signal transmitter and the memory circuit. A radar signal receiving circuit is used to receive radar signals and it includes data acquisition path circuitry with multiple circuit paths to process streams of data in response to the sensor circuitry, and further includes a receive-side master controller to convey data via the bus-interface circuit, to the buffers of the memory circuit for supporting the sensor data via the multiple virtual channels and the multiple data types. The receive-side master controller also generates selectable-type transactions to be linked in selected ones of the buffers, and this is in response to the data provided from the sensor circuitry and based on the sensor data being provided via different ones of the multiple virtual channels and of the multiple data types.

Consistent with the above-discussed aspects of the present disclosure, certain examples are directed to radar methodology and a data acquisition system that receives high speed serial traffic from external radar using an MIPI CSI2 interface and with received traffic data using multiple virtual channels and multiple data types. In many applications, each virtual channel can use multiple data types. For example, radar ADC data can use one data type while user and/or embedded data and/or safety information can use or correspond to other data types when transferred from the sensor circuitry to the receive path's microcontroller (e.g., CPU in the receive data acquisition circuitry), and in certain instances such data might be broken up for transferring via different ones of the multiple virtual channels.

Similarly on the transmit side of such radar communications, oftentimes there may be need to fetch descriptors and/or control information and/or other data for transferring or transmitting radar configuration to sensors in the sensor circuitry (external to the SoC IC fabric). If the receive acquisition system were generating only the coherent or only the non-coherent transactions to the system for all virtual channels and all data types all the time, system throughput and overall system performance would be degraded. Further, if a transmitting module were generating only the coherent or only the non-coherent transactions for all the virtual channels and/or data types, the system would experience similar performance degradation.

According to one aspect of the present disclosure, data type and/or virtual channel (VC) based coherency and tracing attributes are used in transactions generated by (radar and/or vision) receive data acquisition path circuitry, and VC and data type, and/or data or control traffic based coherency attribute in transactions generated in the radar configuration transmit path. The coherency attribute allows optimal use of the interconnect fabric and different SOC masters/processor for optimal performance. Traceable or non-traceable attributes allows for trace-bandwidth optimization of the switching bus circuitry.

Acquisition circuitry may use coherent transactions to write to memory when the data can be cache processed by the master processor using the shared cache for virtual channels. In this case, using non-coherent transactions would reduce the overall performance or throughput of the system and switching fabric (or the interconnecting bus circuitry); this follows since the master processor can handle the coherent transactions. The acquisition circuitry can use non-coherent transactions when required, thereby relieving the system fabric from the burden of snooping processer caches. Even the master processor that is processing these transactions may not have access to the shared cache, and the coherent transactions may be benefited by being converted to non-coherent transactions by the switching fabric. Similarly on the transmit path, control traffic could use the coherent transactions while data traffic can use either coherent or non-coherent type transactions. Additionally the overall SOC trace bandwidth can also be used optimally by having the selectable traceable or non-traceable transactions on the basis of virtual channels and data types.

Accordingly, certain exemplary aspects of the present disclosure include use of selectable coherent or non-coherent transaction on per data type or virtual channel basis, by the radar data acquisition system to support different input traffic and system use cases (e.g., to optimize use of the interconnect and different masters/processors) and/or by the radar transmitter to support different output traffics and system use cases (e.g., to optimize use of the of the interconnect and different masters/processors). Other exemplary aspects include use of selectable traceable or non-traceable transactions on per data type or virtual channel basis by radar data acquisition system (e.g., to optimize use of available SOC debug trace bandwidth) and also by the radar transmitter in connection with data or control traffic basis (e.g., to optimize use of available SOC debug trace bandwidth).

Turning now to the drawing and relating to the above-disclosed aspects and embodiments, FIG. 1 illustrates a block diagram of example radar circuitry. Block 110 is the signal processing circuitry which controls configuration for the transmit circuitry 120 and receive circuitry 125 and in certain instances where the system is installed in a vehicle, either of these circuits may be coupled to the vehicle's master-control unit which includes logic and computer circuitry for communicating with the various sensors throughout the vehicle. Data type and virtual channel based coherency and tracing attributes may be passed in transactions generated by radar/vision receive circuitry data acquisition path 135, for example, depending on the type or types of sensor circuitries such as an RF radar sensor or a camera for vision. Also, based on the virtual channels and data types used by the sensor circuitry, and data or control traffic based coherency attribute may be passed in transactions generated in the radar configuration transmit path 130.

Figure 2:
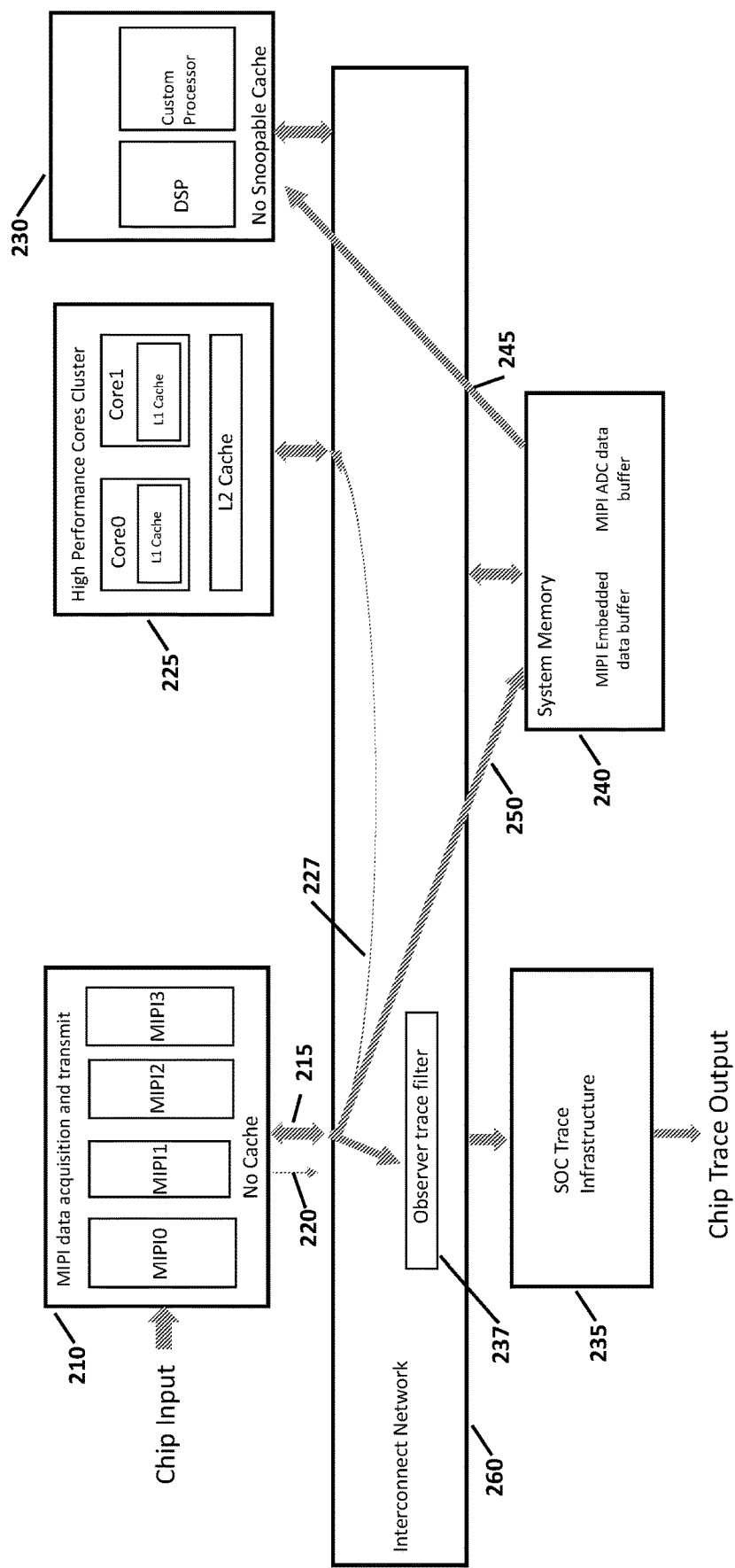
FIG. 2 is a more detailed system-level diagram illustrating an example radar system signal processing circuitry, in accordance with the present disclosure.

FIG. 2 is a more detailed illustration of an example signal processing logic circuitry such as in FIG. 1. Block 210 takes, as input, external radar data from sensor circuitry. The radar sends multiple virtual channels and data types using MIPI CSI2, which does not specify coherency or tracing attributes. Within block 210, software manages the coherency and tracing attributes on per system memory buffer basis in radar/vision data acquisition path. The ACE-Lite interface path 215 allows for selectable coherency. The data path 220 may be used for side band signaling for selectable trace. Block 225 is a high-performance processor core cluster containing an L2 cache, while block 230 shows the DSP processor(s) along with custom processor(s)/accelerator(s). The DSP processor(s) along with custom processor(s)/accelerator(s) may include no snoopable cache. The path noted by 227 illustrates coherent MIPI embedded data directed cache processed by cores where the coherency attribute on MIPI output transaction is used. The SOC trace infrastructure is illustrated by block 235. Data flowing to SOC trace infrastructure 235 is controlled by the observer trace filter 237. Only MIPI embedded data type traffic from the MIPI path is sent to SOC trace out. The tracing attribute on the MIPI output transaction is used to filter embedded trace.

Continuing with block 240 of FIG. 2; the system memory is depicted as having a MIPI embedded data buffer and a MIPI ADC data buffer. Paths 245 and 250 are for non-coherence MIPI ADC data as being directed to system memory first and is then processed by DSP and/or processor 230. The interconnect network 260 is a bus-interface circuit to control bus interconnects for bus communications involving the radar signal transmitter and the memory circuit, among other bus-enabled communication circuits which may play roles in the system. One example design implements the interconnect network 260 using the commercially available Flexnoc IP Network technology (e.g., FlexNoC Network on Chip SoC Interconnect IP). The interconnect network 260 allows for fully coherent data flow for processors 225 and IO while allowing for coherent data flow for MIPI and DSP and/or accelerators 230 (DSP and ADC respectively referring to digital signal processors and analog-digital converted or conversion).

Figure 3:
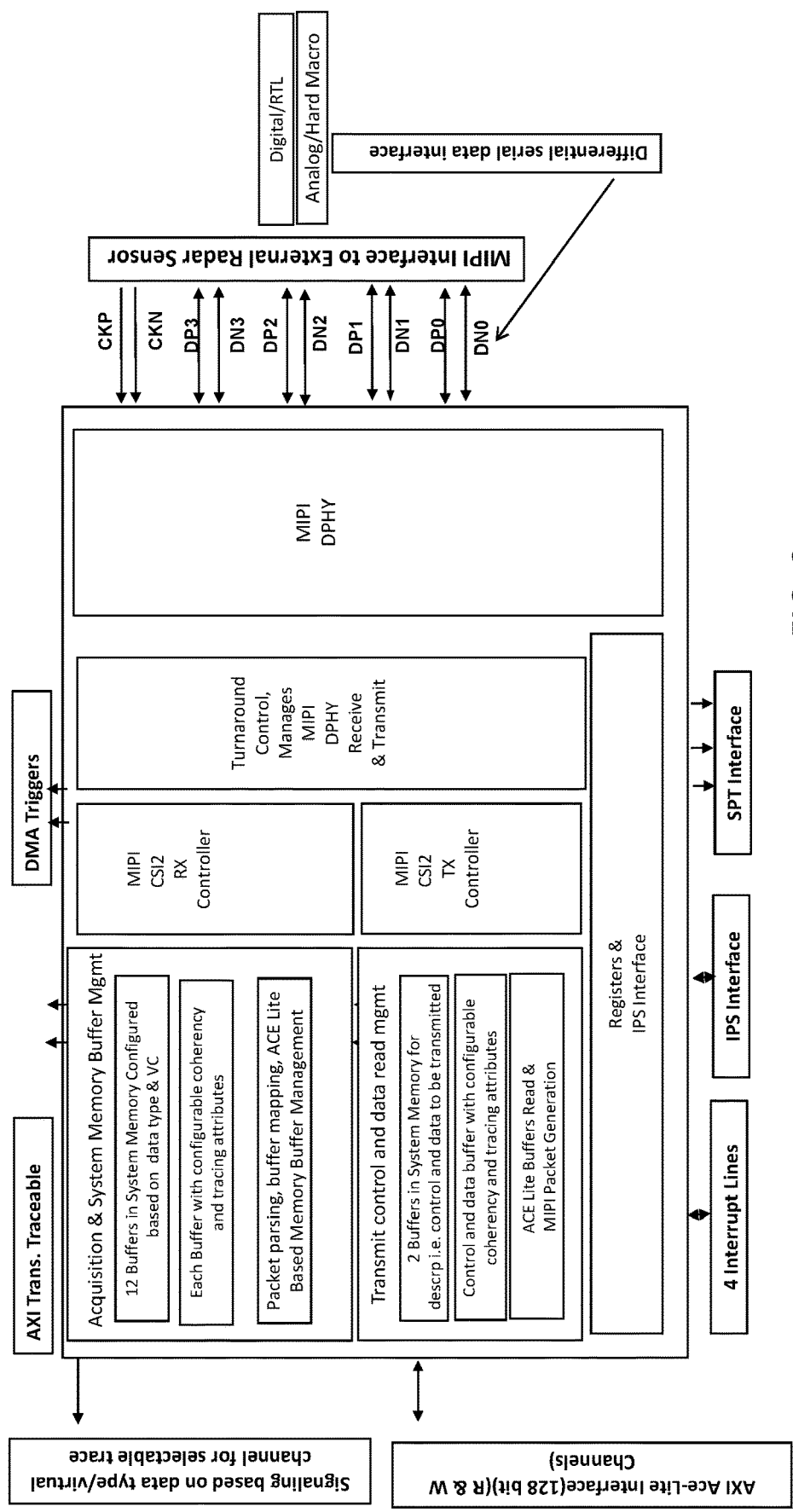
FIG. 3 is a system-level diagram illustrating an example radar systems individual MIPI subsystem circuitry, in accordance with the present disclosure.

FIG. 3 illustrates an individual MIPI subsystem for radar that has selectable coherency and tracing attributes based on data type and virtual channel and/or buffer basis, and data or control traffic basis.

Figure 4:
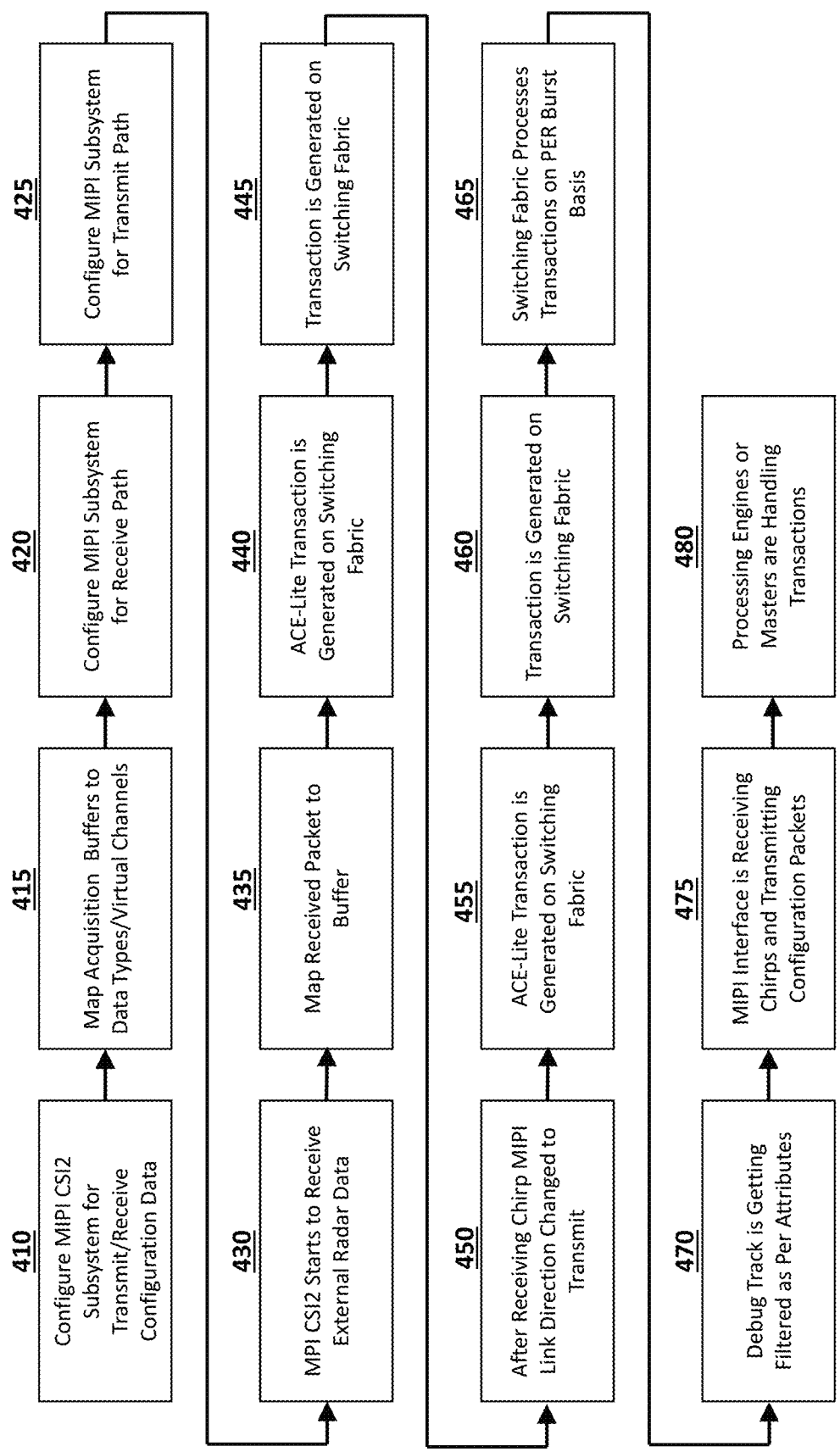
FIG. 4 is a flow chart illustrating an exemplary set of activities and/or data flow for a system of the type implemented in a manner consistent with FIG. 1, in accordance with the present disclosure.

FIG. 4 is a flow chart illustrating an exemplary set of activities and/or data flow for a system of the type implemented in a manner consistent with FIG. 1. The first block 410 is a step to configure the MIPI CSI2 subsystem with transmit and/or receive configuration data. Block 415 illustrates the step where 12 acquisition buffers in system memory may be mapped to different data types/virtual channels. One pointer is configured in transmit for control and/or descriptor traffic and the pointer for data traffic is found from the descriptor. The next block 420 illustrates configuration of the MIPI subsystem to generate coherent or non-coherent transactions and traceable/non traceable transactions in the receive path on per buffer basis (i.e. based on virtual channel and data type). Configuration is dependent on the performance needs, switching fabric capabilities, processing engine/master's capability. Block 425 illustrates a step where, depending on the performance needs, switching fabric capabilities, control traffic generator and configuration data generator, the MIPI subsystem is configured to generate coherent or non-coherent transactions in the transmit path with a virtual channel and data type, and control (i.e. descriptor or data traffic basis).

Continuing with FIG. 4, at block 430 an initialized MIPICSI2 receive (RX) acquisition module starts to receive external radar data, parse packets, and decode data types and virtual channels. Next at block 435 the received packet or chirp is mapped to the appropriate buffer in system memory. Depending on the data type and/or virtual channel and/or buffer, a coherent or non-coherent ACE-Lite transaction is then generated on the switching fabric as shown in block 440. Next, depending on the data type and/or virtual channel and/or buffer, a traceable or not traceable transaction is generated on the switching fabric as illustrated by block 445. Block 450 illustrates that after receiving a chirp and completing the transactions to switching fabric for this chirp, MIPI link direction changes to transmit. Next, depending on the virtual channel and data type, and data or control traffic, a coherent or non-coherent ACE-Lite transaction is generated on the switching fabric as illustrated in block 455. At block 460, depending on the data type and control traffic, a traceable or non-traceable transaction is generated on switching fabric. The switching fabric then processes transactions on per burst basis and handles coherency and tracing needs as per the specified attributes, as shown in block 465. In block 470, the debug trace is filtered as per the attributes and going out of the chip through SOC debug infrastructure. As shown in block 475, the MIPI interface may be receiving radar chirps and transmitting configuration packets in chirp pause time. The next block 480 illustrates the processing engines or masters handling transactions as per their coherency needs.

Figure 5:
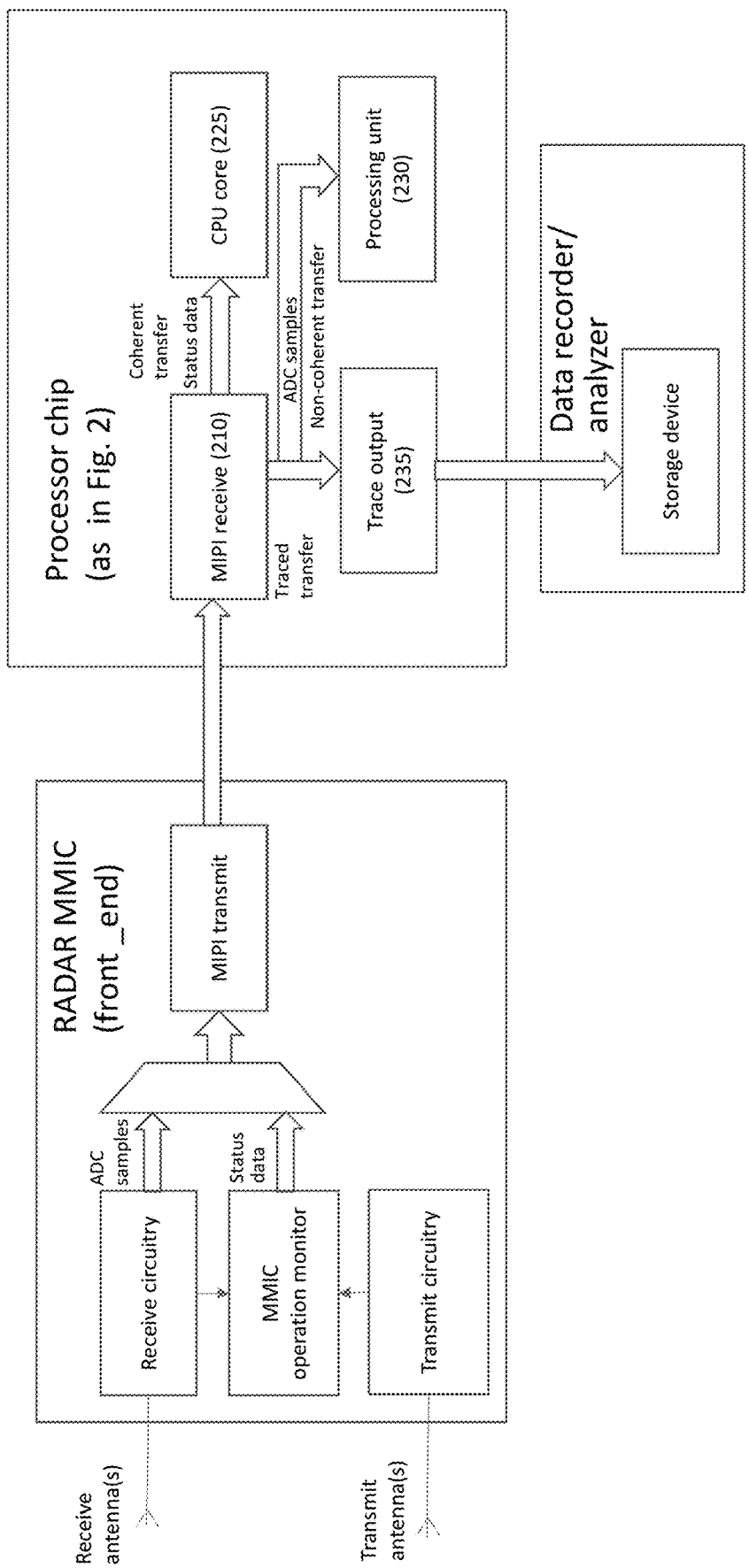
FIG. 5 is a block diagram showing an example of a system, according to the present disclosure, in a radar application.

In block-diagram form, FIG. 5 shows an exemplary system according to the present disclosure to illustrate a type of architecture such as shown in FIGS. 1-4 in a radar application. The respective left and right sides of FIG. 5 illustrate an exemplary front-end radar block (e.g., aligning with antenna-coupled transmit and receive paths as in FIG. 1) and an exemplary integrated circuit that includes a processor chip with memory (e.g., aligning with multiple blocks 210, 225, 230 and 235 in FIG. 2). The right side further shows the processor parsing and sending MIPI-based trace transfers to memory for analysis, and both status data relating to coherent transactions and ADC samples relating to non-coherent transactions (based on received signals and as processed through the MIPI transmit block on the left side) for further processing by one or more microcomputers such as the core processor 230 and processing unit 235 of FIG. 2.

Figure 6:
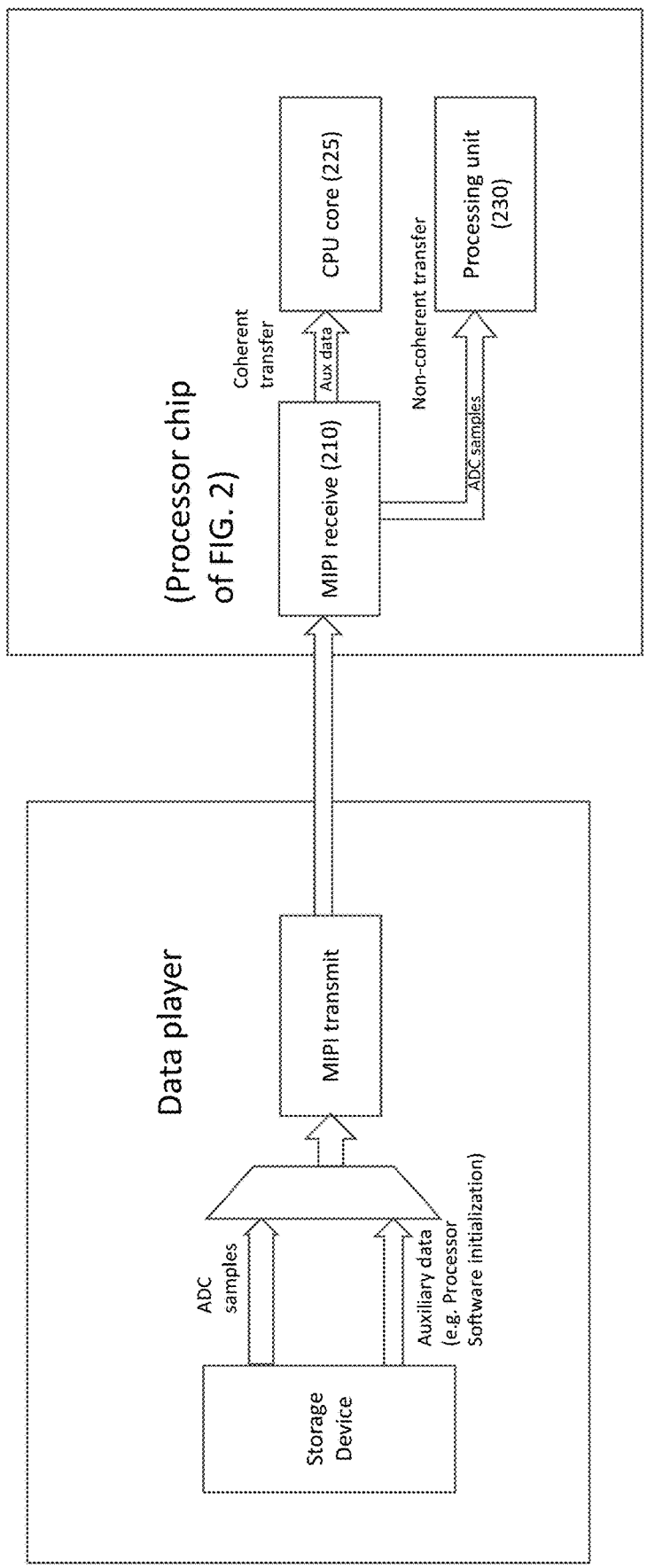
FIG. 6 is a block diagram, also according to the present disclosure, showing an example sensor test application including hardware (circuitry) in a testing loop for trace testing MIPI-based hardware blocks which are depicted in one or more of the above figures.

Expanding on the example of FIG. 5, FIG. 6 shows a sensor test application including hardware (circuitry) in the testing loop. The respective left and right sides of FIG. 6 illustrate an exemplary front-end data player (e.g., extracting data from the memory on the right side of FIG. 5) and an exemplary integrated circuit that includes a processor chip (e.g., aligning with blocks 210, 225 and 230 in FIG. 2). The left and right sides further the flow of auxiliary data being transferred through the MIPI transmit and receive blocks (e.g., as such blocks in FIG. 2) for trace testing as may be executed with use of the one or more microcomputers (core processor 230 and processing unit 235) of FIGS. 2 and 5. As the receive and transmit paths in FIGS. 5 and 6 work on related data, this trace processing may be cycled through the MIPI transmit and receive blocks repeatedly and so as to test various hardware and configuration/functional aspects.

As above, the Specification describes and/or illustrates example aspects useful for implementing the claimed disclosure by way of various circuits or circuitry which may be illustrated as or using terms such as blocks, modules, device, system, unit, controller, and/or other circuit-type depictions (e.g., reference numerals 130 and 135 of FIG. 1 depict such a block and/or module as described herein). Such circuits or circuitry are used together with other elements to exemplify how certain embodiments may be carried out in the form or structures, steps, functions, operations, activities, etc.

For example, in certain of the above-discussed embodiments, one or more modules are discrete logic circuits or programmable logic circuits configured and arranged for implementing these operations and/or activities, as may be carried out in the approaches shown in FIG. 2. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described at FIG. 4 is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. A radar data acquisition apparatus for use with sensor circuitry, including multiple radar sensors, to provide sensor data via multiple virtual channels and multiple data types, and to receive configuration data useful for configuring the multiple radar sensors, the apparatus comprising:
   a memory circuit having a plurality of buffers;
   a bus-interface circuit to control bus interconnects for bus communications involving a radar signal transmitter and the memory circuit; and
   a radar signal receiving circuit to receive radar signals and including data acquisition path circuitry with multiple circuit paths to process streams of data in response to the sensor circuitry, and further including a receive-side master controller to:
      convey data, via the bus-interface circuit, to the plurality of buffers of the memory circuit for supporting the sensor data via the multiple virtual channels and the multiple data types; and
      generate a plurality of selectable-type transactions to be linked in selected ones of the plurality of buffers, in response to the data provided from the sensor circuitry and based on the sensor data being provided via different ones of the multiple virtual channels and of the multiple data types,
   wherein one or more data-processing efficiency parameters are associated with data throughput pertaining to at least one of: bandwidth or use of one or more computer processors integrated within the apparatus, cache-processing availability, debug-tracing bandwidth relating to the bus-interface circuit, and switching capabilities of the bus-interface circuit.

2. The radar data acquisition apparatus of claim 1, wherein each of the plurality of selectable-type transactions is identifiable as a either a coherent transaction or a non-coherent transaction.

3. The radar data acquisition apparatus of claim 1, wherein each of the plurality of selectable-type transactions is identifiable as a traceable transaction or a non-traceable transaction.

4. The radar data acquisition apparatus of claim 1, wherein each of the plurality of selectable-type transactions is identifiable: as a coherent transaction or a non-coherent transaction; and as a traceable transaction or a non-traceable transaction, and wherein the plurality of selectable-type transactions to be processed to manage one or more data-processing efficiency parameters is associated with at least one of the radar signal transmitter, the bus-interface circuit, and the radar signal receiving circuit.

5. The radar data acquisition apparatus of claim 1, wherein the multiple circuit paths of the data acquisition path circuitry are configured to process streams of ADC (analog-to-digital converted) data to support the sensor circuitry.

6. The radar data acquisition apparatus of claim 1, further including a radar signal transmitter to transmit radar signals, wherein the radar signal transmitter includes a transmit-side master controller to access the memory circuit through the bus-interface circuit.

7. The radar data acquisition apparatus of claim 1, further including a radar signal transmitter to transmit radar signals, wherein the radar signal transmitter is to transmit radar signals towards an object to create reflected or echo signals and to enable the multiple radar sensors with abilities to receive chirp-to-chirp radar signals based on dynamic configuration parameters.

8. The radar data acquisition apparatus of claim 1, further including an interface to a vehicle-specific master-control unit which includes logic and computer circuitry, and wherein the radar data acquisition apparatus is to be installed and used in a moving vehicle.

9. The radar data acquisition apparatus of claim 1, further including Silicon-on-chip integrated circuit (SOC IC), wherein at least the bus-interface circuit is part of the SoC IC, and wherein at least one of the of the plurality of selectable-type transactions is identifiable as a traceable transaction for debug tracing in the SOC IC.

10. The radar data acquisition apparatus of claim 1, wherein the sensor circuitry is to receive the configuration data through the bus interface circuit.

11. The radar data acquisition apparatus of claim 1, further including the sensor circuitry.

12. The radar data acquisition apparatus of claim 1, further including the radar signal transmitter to transmit radar signals.

13. The radar data acquisition apparatus of claim 1, further including a radio frequency (RF) transmitter to transmit RF chirp signals and a RF receiver to receive echo or reflection signals in response to the RF chirp signals.

14. The radar data acquisition apparatus of claim 1, wherein the bus-interface circuit is to operate in compliance with MIPI CSI2 ((Mobile Industry Processor Interface Camera Serial Interface 2).

15. A method for use in a radar data acquisition apparatus having sensor circuitry including multiple radar sensors to provide sensor data via multiple virtual channels and multiple data types, and to receive configuration data useful for configuring the multiple radar sensors, a memory circuit with a plurality of buffers, and a bus-interface circuit to control bus interconnects for bus communications involving a radar signal transmitter and the memory circuit, the method comprising:
receiving, via a radar signal receiving circuit, radar signals and processing, via data acquisition path circuitry with multiple circuit paths, streams of data in response to the sensor circuitry; and
using a receive-side master controller to:
convey data, via the bus-interface circuit, to the plurality of buffers of the memory circuit for supporting the sensor data via the multiple virtual channels and the multiple data types; and
generate a plurality of selectable-type transactions to be linked in selected ones of the plurality of buffers, in response to the data provided from the sensor circuitry and based on the sensor data being provided via different ones of the multiple virtual channels and of the multiple data types,
wherein one or more data-processing efficiency parameters are associated with data throughput pertaining to at least one of: bandwidth or use of one or more computer processors integrated within the apparatus, cache-processing availability, debug-tracing bandwidth relating to the bus-interface circuit, and switching capabilities of the bus-interface circuit.

16. The method of claim 15, wherein each of the plurality of selectable-type transactions is identifiable as at least one of: coherent transaction or a non-coherent transaction; and/a traceable transaction or a non-traceable transaction.

17. The method of claim 15, wherein the plurality of selectable-type transactions to be processed to manage one or more data-processing efficiency parameters is associated with at least one of the radar signal transmitter, the bus-interface circuit, and the radar signal receiving circuit.

18. The method of claim 15, further including using the apparatus in a moving vehicle, and wherein the bus-interface circuit is operated in compliance with MIPI CSI2 ((Mobile Industry Processor Interface Camera Serial Interface 2).

* * * * *